United States Patent
Lee et al.

(10) Patent No.: US 8,563,155 B2
(45) Date of Patent: Oct. 22, 2013

(54) BATTERY MODULE HAVING EXCELLENT HEAT DISSIPATION ABILITY AND BATTERY PACK EMPLOYED WITH THE SAME

(75) Inventors: Jin Kyu Lee, Busan (KR); Hee Soo Yoon, Daejeon (KR); Bumhyun Lee, Seoul (KR); Dal Mo Kang, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 351 days.

(21) Appl. No.: 12/672,160

(22) PCT Filed: Sep. 4, 2009

(86) PCT No.: PCT/KR2009/004995
§ 371 (c)(1),
(2), (4) Date: Jun. 28, 2010

(87) PCT Pub. No.: WO2010/067943
PCT Pub. Date: Jun. 17, 2010

(65) Prior Publication Data
US 2011/0223457 A1    Sep. 15, 2011

(30) Foreign Application Priority Data
Dec. 12, 2008    (KR) .................. 10-2008-0126798

(51) Int. Cl.
*H01M 10/50*    (2006.01)
(52) U.S. Cl.
USPC ........................................ 429/120
(58) Field of Classification Search
USPC ........................................ 429/120
See application file for complete search history.

(56) References Cited

U.S. PATENT DOCUMENTS

| | | | |
|---|---|---|---|
| 6,821,671 B2 * | 11/2004 | Hinton et al. | ............. 429/120 |
| 6,933,076 B2 | 8/2005 | Ura et al. | |
| 2004/0180257 A1 | 9/2004 | Kimoto | |
| 2006/0214641 A1 | 9/2006 | Cho | |
| 2007/0269714 A1 | 11/2007 | Watanabe et al. | |

FOREIGN PATENT DOCUMENTS

| | | |
|---|---|---|
| EP | 1753058 A2 | 2/2007 |
| JP | 60-107274 A | 6/1985 |
| JP | 8-148187 A | 6/1996 |
| JP | 2004-103258 A | 4/2004 |
| JP | 2006-196230 A | 7/2006 |
| KR | 10-2006-0102851 A | 9/2006 |
| KR | 10-2008-0042965 A | 5/2008 |
| WO | WO-2008130148 | * 10/2008 |

* cited by examiner

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Disclosed herein is a battery module constructed in a structure in which a plurality of plate-shaped battery cells are sequentially stacked in a module case, wherein each of the plate-shaped battery cells includes an electrode assembly of a cathode/separator/anode structure mounted in a battery case formed of a laminate sheet including a resin layer and a metal layer, a plurality of heat dissipation members are disposed at two or more interfaces between the battery cells, and a heat exchange member integrally interconnecting the heat dissipation members is mounted to one side of a stack of the battery cells, whereby heat generated from the battery cells during the charge and discharge of the battery cells is removed by the heat exchange member.

16 Claims, 5 Drawing Sheets

600

BATTERY MODULE HAVING EXCELLENT HEAT DISSIPATION ABILITY AND BATTERY PACK EMPLOYED WITH THE SAME

TECHNICAL FIELD

The present invention relates to a battery module having excellent heat dissipation ability and a battery pack including the same, and, more particularly, to a battery module constructed in a structure in which a plurality of plate-shaped battery cells are sequentially stacked in a module case, wherein each of the plate-shaped battery cells includes an electrode assembly of a cathode/separator/anode structure mounted in a battery case formed of a laminate sheet including a resin layer and a metal layer, a plurality of heat dissipation members are disposed at two or more interfaces between the battery cells, and a heat exchange member integrally interconnecting the heat dissipation members is mounted to one side of a stack of the battery cells.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell (unit cell) of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

Battery cells constituting such a middle- or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof, with the result that it is difficult to effectively lower the overall temperature of the battery cells.

That is, if the heat, generated from the battery module during the charge and discharge of the battery module, is not effectively removed, the heat accumulates in the battery module, with the result that the deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Each battery module mounted in a middle- or large-sized battery module is generally manufactured by stacking a plurality of battery cells with high integration such that the battery cells are spaced apart at predetermined intervals to remove heat generated from the battery cells during the charge and discharge of the battery cells. For example, the battery cells may be sequentially stacked while the battery cells are spaced apart at predetermined intervals without additional members. For battery cells exhibiting low mechanical strength, on the other hand, one or more battery cells are mounted in a cartridge, and a plurality of the cartridges are stacked to construct a battery module. Coolant channels may be formed between the stacked battery cells or the stacked battery modules to effectively remove heat accumulating between the battery cells or the battery modules.

In this structure, however, it is necessary to provide a plurality of coolant channels corresponding to the plurality of battery cells, with the result that the overall size of the battery module increases.

Also, the more the battery cells are stacked, the narrower the width of each the coolant channel is, when considering the size of the battery module. As a result, it is complicated to design a cooling structure. That is, the coolant channels having a width narrower than an inlet port of a coolant cause high pressure loss, with the result that there is great difficulty in designing the shape and position of inlet and outlet ports of the coolant. Also, a fan may be further installed to prevent such pressure loss. As a result, there are design restrictions in, for example, power consumption, fan noise, and space.

Consequently, there is a high necessity for a battery module that provides high-power, large-capacity electric power, is manufactured in a simple and compact structure, and has excellent service life and safety characteristics.

DISCLOSURE OF INVENTION

Technical Problem

Therefore, the present invention has been made to solve the above problems, and other technical problems that have yet to be resolved.

It is an object of the present invention to provide a battery module constructed in a structure to minimize the formation of coolant channels and achieve heat transfer by conduction, thereby maintaining the overall temperature of the battery module, while restraining the increase in overall size of the battery module, to reduce temperature deviation.

Technical Solution

In accordance with one aspect of the present invention, the above and other objects can be accomplished by the provision of a battery module constructed in a structure in which a plurality of plate-shaped battery cells are sequentially stacked in a module case, wherein each of the plate-shaped battery cells includes an electrode assembly of a cathode/separator/anode structure mounted in a battery case formed of a laminate sheet including a resin layer and a metal layer, a plurality of heat dissipation members are disposed at two or more interfaces between the battery cells, and a heat exchange member integrally interconnecting the heat dissipation members is mounted to one side of a stack of the battery cells, whereby heat generated from the battery cells during the charge and discharge of the battery cells is removed by the heat exchange member.

Generally, a battery module is constructed in a structure in which battery cells are stacked such that the battery cells spaced apart at predetermined intervals to form a coolant channel, and air flows through the space (in an air-cooling fashion) to prevent the battery cells from overheating. However, it is not possible to obtain a sufficient heat dissipation effect.

In the battery module according to the present invention, however, the plurality of heat dissipation members are disposed at two or more interfaces between the battery cells, and the heat exchange member integrally interconnecting the heat dissipation members is mounted to one side of the stack of the battery cells. Consequently, it is possible to cool the stack of the battery cells with higher efficiency than conventional cooling systems even with no spaces between the battery cells or with very small spaces between the battery cells, thereby maximizing heat dissipation efficiency of the battery module and stacking the battery cells with high integration.

As a result, it is possible for the battery module according to the present invention to effectively discharge heat generated from the battery cells to the outside by conduction using the heat dissipation members and the heat exchange member, which are constructed in specific structures.

In an exemplary embodiment, each of the battery cells is a light-weight pouch-shaped battery having an electrode assembly mounted in a battery case formed of a laminate sheet including a thermally weldable inner resin layer, a blocking metal layer, and a durable outer resin layer.

In another exemplary embodiment, each of the battery cells is mounted in a frame-type battery cartridge. This structure is preferably applicable to a battery having sealing portions formed at the edges thereof by thermal welding.

In the above structure, the cartridge includes at least one pair of plate-shaped frames for fixing edges of each of the battery cells in a state in which at least one side of each of the battery cells is exposed, and each of the frames is provided at the outer surface thereof with elastically pressing members for fixing the corresponding heat dissipation member to the exposed side of each of the battery cells in a tight contact fashion.

Consequently, when a plurality of cartridges in which the battery cells are mounted are stacked, and the heat dissipation members are disposed between the cartridges, the elastically pressing members mounted at the outer surfaces of the frames enhance the structural stability of the cartridge stack and ensure that the heat dissipation members are effectively fixed to the cartridge stack.

Since each of the cartridges includes at least one pair of plate-shaped fames, it is possible that not only is one battery cell mounted in each of the cartridges but also two or more battery cells are mounted in each of the cartridges. For example, in a structure in which two battery cells are mounted in each of the cartridges, a middle frame may be mounted between the battery cells. As a result, one of the battery cells may be mounted between the upper frame and the middle frame, and the other battery cell may be mounted between the middle frame and the lower frame. Even in this case, it is possible for the heat dissipation members to be in contact with the outer surfaces of the respective battery cells, thereby exhibiting a heat dissipation effect by heat conduction.

The elastically pressing members are not particularly restricted as long as the elastically pressing members are mounted on each of the frames for fixing the corresponding heat dissipation member during the assembly of the battery module. For example, the elastically pressing members may be mounted to upper and lower sides and/or left and right sides of the outer surface of each of the frames.

Consequently, the heat dissipation members are effectively tightly pressed by the elastically pressing members mounted at the outer surfaces of the respective frames for improving the fixation of the heat dissipation members to the corresponding frames, and therefore, the use of additional members for fixing the heat dissipation members is not necessary.

According to circumstances, the elastically pressing members may be further mounted to the inner surface of each of the frames contacting the sealing portions of each of the battery cells.

In an exemplary embodiment, each of the battery cells is mounted to the frames in a state in which the exposed side of each of the battery cells protrudes from the corresponding frame, and the elastically pressing members are mounted to the outer surfaces of the frames with a height greater than a protruding height of the exposed side of each of the battery cells.

That is, the frames formed to have a height less than that of each of the battery cells fix only the edges of each of the battery cells, and therefore, it is possible to effectively achieve heat dissipation through the protruding exposed sides of each of the battery cells. Also, the elastically pressing members mounted such that the elastically pressing members are located at a height greater than that of the protruding exposed sides of each of the battery cells may effectively press the heat dissipation members against the exposed sides of battery cells in a tight contact fashion when the heat dissipation members are mounted between the battery cells. Consequently, it is possible to increase the overall mechanical strength of the battery module without the increase in size of the battery module using the heat dissipation members.

The elastically pressing members mounted at the outer surfaces of the frames are not particularly restricted as long as the elastically pressing members are made of a material providing an elastically pressing force when the material is pressed. Preferably, the elastically pressing members are made of a polymer material exhibiting an elastically physical property. The polymer material may exhibit an elastic force due to its own material properties or its structural or shape property. A representative example of the former may be rubber, and a representative example of the latter may be a polymer material foam structure.

The elastically pressing members may be mounted at the frames in various manners. For more efficient fixing, each of the frames may be provided at the outer surface thereof with grooves, and the elastically pressing members may be located in the respective grooves.

Each of the elastically pressing members may have a width equivalent to 10% or more of that of each of the frames. If the width of each of the elastically pressing members is much less than that of each of the frames, little effect may be obtained when the elastically pressing members are mounted. On the other hand, if the width of each of the elastically pressing members is much greater than that of each of the frames, the elastically pressing members elastically deformed when the elastically pressing members are pressed cover relatively large portions of the heat dissipation members, with the result that the heat dissipation effect is lowered. Furthermore, the elastically pressing members may protrude out of the corresponding frames. As long as the above-mentioned problems are not caused, therefore, it is a matter of course that the width of each of the elastically pressing members may be outside the above-specified range.

Meanwhile, each of the heat dissipation members is not particularly restricted as long as each of the heat dissipation members is made of a thermally conductive material. For example, each of the heat dissipation members may be formed of a metal plate exhibiting high thermal conductivity. The heat dissipation members may be disposed at the interfaces between the respective battery cells or at the interfaces between some of the battery cells. For example, when the heat dissipation members are disposed at the interfaces between the respective battery cells, each of the battery cells comes into contact with different heat dissipation members at the opposite sides thereof. On the other hand, when the heat dissipation members are disposed at the interfaces between some of the battery cells, some of the battery cells may come into contact with the heat dissipation member only at one side of each of the battery cells.

Also, the heat exchange member is not particularly restricted as long as the heat exchange member is made of a material exhibiting high thermal conductivity. Preferably, the heat exchange member is made of a metal material exhibiting higher thermal conductivity and mechanical strength than other materials. The heat exchange member is connected to the heat dissipation members, and therefore, heat transfer is effectively achieved.

Preferably, the heat dissipation members are disposed at the interfaces between the battery cells in a state in which at least a portion of each of the heat dissipation members is exposed outside the stacked battery cells, and the exposed portions are bent toward the corresponding sides of the battery cells. That is, the heat dissipation members disposed at the interfaces between the battery cells receive heat generated from the respective battery cells, and easily transfer the received heat to the heat exchange member through the bent structure. Consequently, the dissipation of heat from the battery cells is effectively achieved.

The heat exchange member may be mounted to the tops of the bent portions of the heat dissipation members using various methods, such as welding and mechanical coupling. Consequently, heat generated from the respective battery cells is transferred to the heat dissipation members disposed between the battery cells, and is then effectively removed by the heat exchange member mounted at one side of the stack of the battery cells.

Preferably, the heat exchange member is provided with one or more coolant channels for allowing a coolant to flow therethrough. For example, coolant channels for allowing a liquid coolant, such as water, to flow therethrough may be formed in the heat exchange member, thereby providing an excellent cooling effect with high reliability as compared with a conventional air-cooling structure.

Specifically, the heat exchange member may be constructed in a structure including a base to the bottom of which the heat dissipation members are tightly connected, opposite sides connected to the base, the opposite sides having the coolant channels formed therethrough in the longitudinal direction, and a plurality of heat dissipation fins extending upward from the base between the opposite sides.

Consequently, heat transferred to the heat dissipation members from the battery cells is conducted to the bottom of the base, and is transferred not only to the coolant flowing along the coolant channels formed through the opposite sides in a water-cooling fashion but also to the heat dissipation fins in an air-cooling fashion, thereby effectively achieving the dissipation of heat from the battery cells.

The heat exchange member is not particularly restricted as long as the heat exchange member is mounted at one side of the stack of the battery cells for easily removing the heat generated from the respective battery cells. Preferably, the heat exchange member is mounted on the upper end of the module case. Consequently, the heat generated from the respective battery cells is dissipated from the module case with high efficiency.

According to circumstances, the module case may be provided at the upper end thereof with a depression having a size sufficient to receive the heat exchange member, and the heat exchange member mounted in the depression may have a height equal to or less than that of the upper end of the module case. This structure is preferable in manufacturing a middle- or large-sized battery pack having high power and large capacity because, even when a plurality of the battery modules are stacked in the direction in which the heat exchange member is mounted, it is not difficult to stack the battery modules due to the heat exchange member.

Meanwhile, a middle- or large-sized battery pack uses a plurality of battery modules to secure high power and large capacity. It is required for the battery modules constituting the battery pack to exhibit higher heat dissipation efficiency for securing the safety of the battery pack.

In accordance with another aspect of the present invention, therefore, there is provided a middle- or large-sized battery pack manufactured by combining the battery modules based on desired power and capacity.

The battery pack according to the present invention includes a plurality of battery cells to achieve high power and large capacity. Consequently, the battery pack is preferably used as a power source for electric vehicles, hybrid electric vehicles, or plug-in hybrid electric vehicles, in which high temperature generated during the charge and discharge of the battery cells is a serious safety concern.

In particular, for the electric vehicles or the plug-in hybrid electric vehicles, in which high power is required through the battery pack for a long time, high heat dissipation is needed. In this aspect, therefore, the battery pack according to the present invention is more preferably used in the electric vehicles or the plug-in hybrid electric vehicles.

BRIEF DESCRIPTION OF DRAWINGS

The above and other objects, features and other advantages of the present invention will be more clearly understood from the following detailed description taken in conjunction with the accompanying drawings, in which.

MODE FOR THE INVENTION

Now, exemplary embodiments of the present invention will be described in detail with reference to the accompanying drawings. It should be noted, however, that the scope of the present invention is not limited by the illustrated embodiments.

Figure 1:
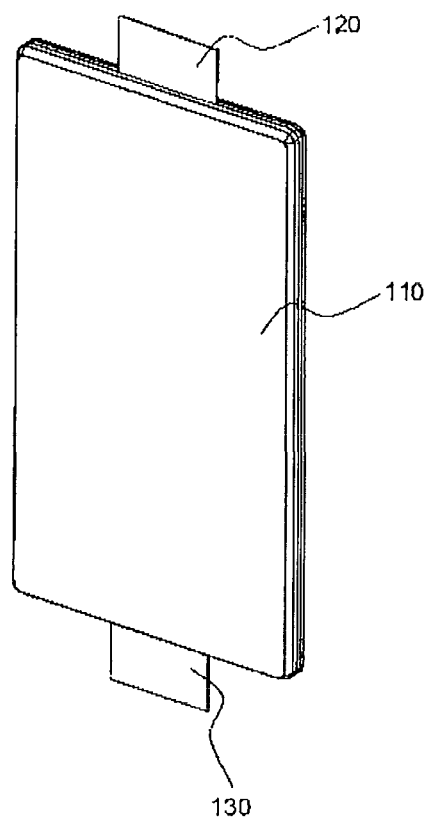
FIG. 1 is a typical view illustrating a plate-shaped battery cell.

FIG. 1 is a typical view illustrating a plate-shaped battery cell.

Referring to FIG. 1, the plate-shaped battery cell 100 includes an electrode assembly (not shown) of a cathode/separator/anode structure mounted in a battery case 110 formed of a laminate sheet including a resin layer and a metal layer. A cathode terminal 120 and an anode terminal 130, electrically connected to the electrode assembly, protrude outward from upper and lower ends of the battery case 110, respectively.

Figure 2:
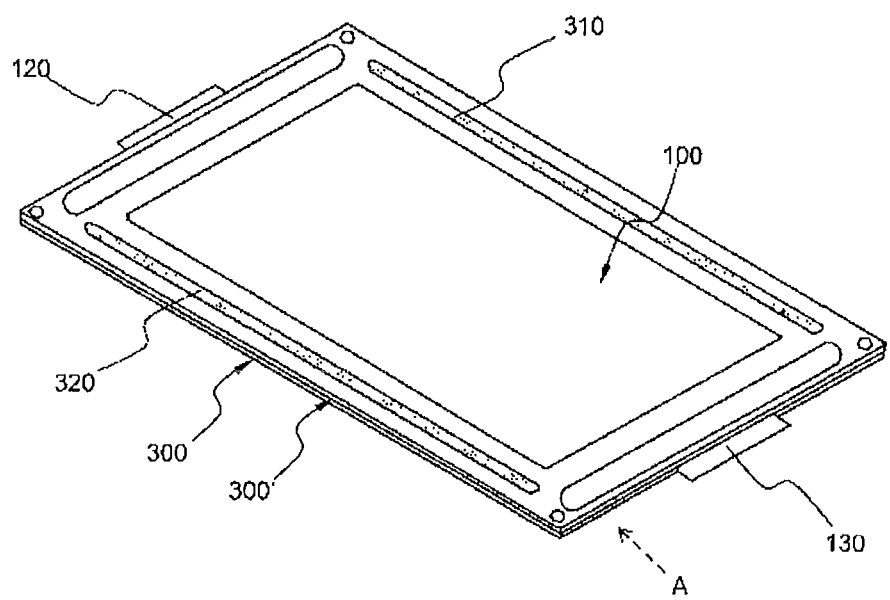
FIG. 2 is a plan view typically illustrating a battery cartridge.
Figure 3:
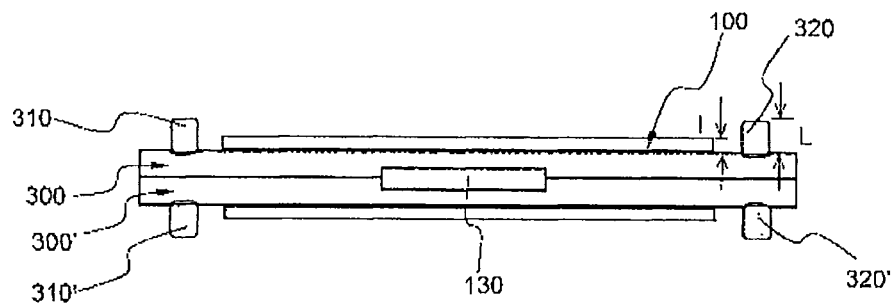
FIG. 3 is a vertical sectional view of the battery cartridge seen in the direction of arrow A indicated in FIG. 2.

FIG. 2 is a plan view typically illustrating a battery cartridge according to an embodiment of the present invention, and FIG. 3 is a vertical sectional view of the battery cartridge seen in the direction of arrow A indicated in FIG. 2.

Referring to these drawings, the battery cartridge 200 has a plate-shaped battery cell 100 mounted therein. Electrode terminals 120 and 130 of the battery cell 100 protrude outward from the battery cartridge 200.

The battery cartridge 200 includes a pair of plate-shaped frames 300 and 300' for fixing opposite-side edges of the battery cell 100 in a state in which opposite sides of the battery cell 100 are exposed.

On the left and right sides of outer surfaces of the frames 300 and 300', pressing members 310, 320 and 310', 320' are mounted such that the pressing members are parallel to each other in the longitudinal direction.

Also, the battery cell 100 is mounted to the frames 300 and 300' in a state in which the exposed sides of the battery cell 100 protrude from the frames 300 and 300'. The elastically pressing members 310, 320 and 310', 320' are mounted to the outer surfaces of the frames 300 and 300' with a height L greater than a protruding height 1 of the exposed sides of the battery cell 100. When heat dissipation members (not shown) are included, therefore, the elastically pressing members 310, 320 and 310', 320' may apply elastically pressing forces to the heat dissipation members (not shown). Also, the heat dissipation members (not shown) is brought into tight contact with the exposed sides of the battery cell 100, while the heat dissipation members are effectively pressed against the exposed sides of the battery cell, by the elastically pressing members 310, 320 and 310', 320'. Consequently, it is possible to effectively achieve heat dissipation without the increase in size of a battery module using the battery cartridge.

Figure 4:
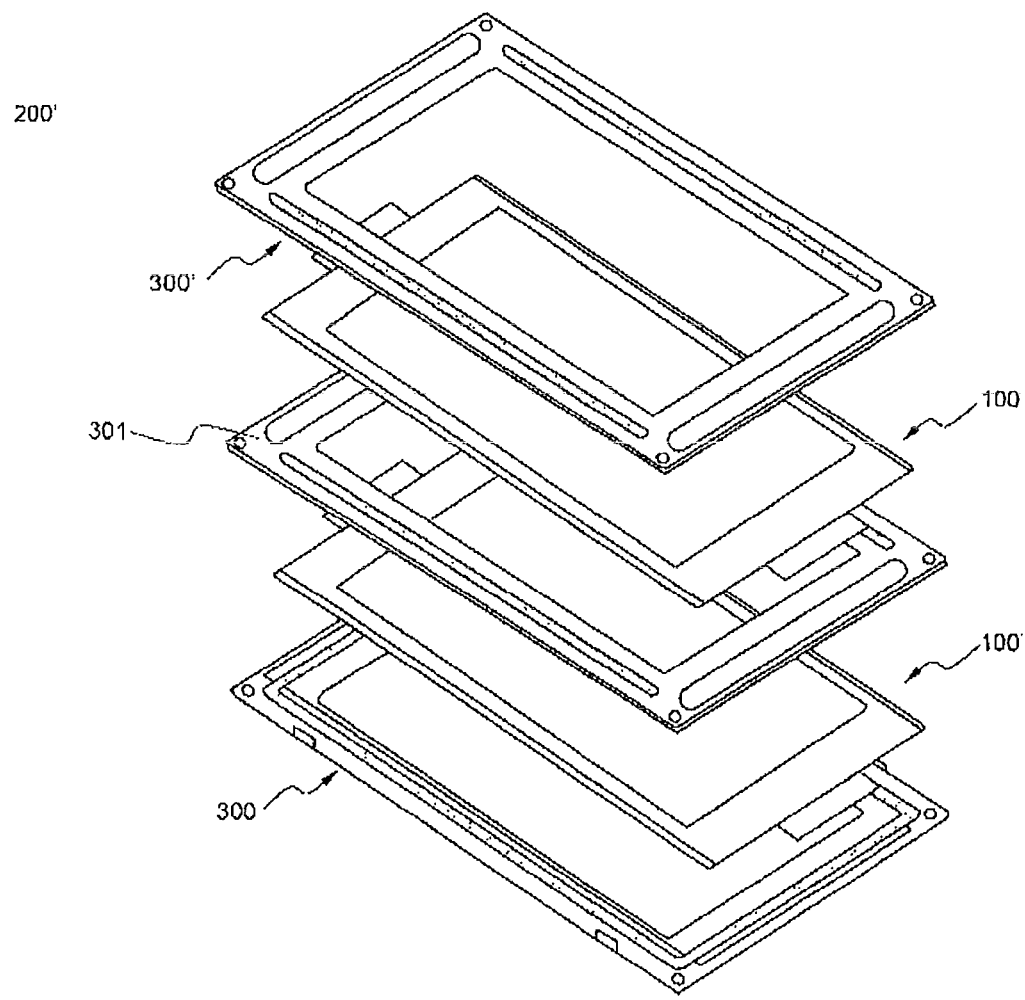
FIG. 4 is an exploded view illustrating a battery cartridge including two battery cells.
Figure 5:
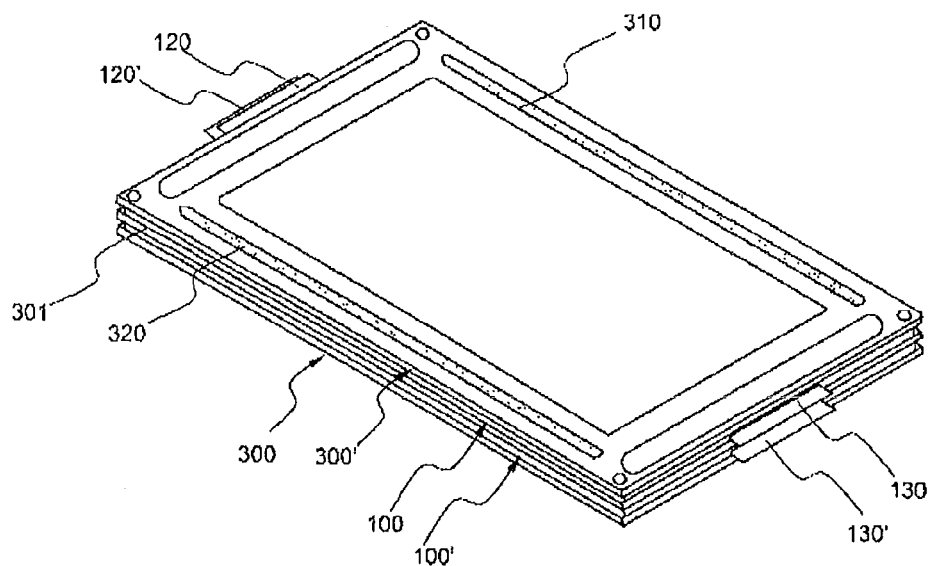
FIG. 5 is a plan view typically illustrating the battery cartridge of FIG. 4.

FIG. 4 is an exploded view typically illustrating a battery cartridge including two battery cells, and FIG. 5 is a plan view typically illustrating the battery cartridge of FIG. 4.

Referring to these drawings, two plate-shaped battery cells 100 and 100' are mounted in a battery cartridge 200' in a state in which the plate-shaped battery cells are stacked. A middle frame 301 is further mounted between the battery cells 100 and 100'. Other components are identical to those of FIG. 2, and therefore, a detailed description thereof will not be given.

This structure provides an excellent heat dissipation effect by heat conduction even when heat dissipation members (not shown) are mounted in a state in which the heat dissipation members are in contact with the outer surfaces of the respective battery cells 100 and 100'. As compared with the structure of FIG. 2, therefore, the heat dissipation members are pressed in a state in which the heat dissipation members are in tight contact with the battery cells by elastically pressing members 310 and 320 mounted at a pair of frames 300 and 300' and the middle frame 301. Consequently, it is possible to effectively achieve heat dissipation while minimizing the size of a battery module.

Figure 6:
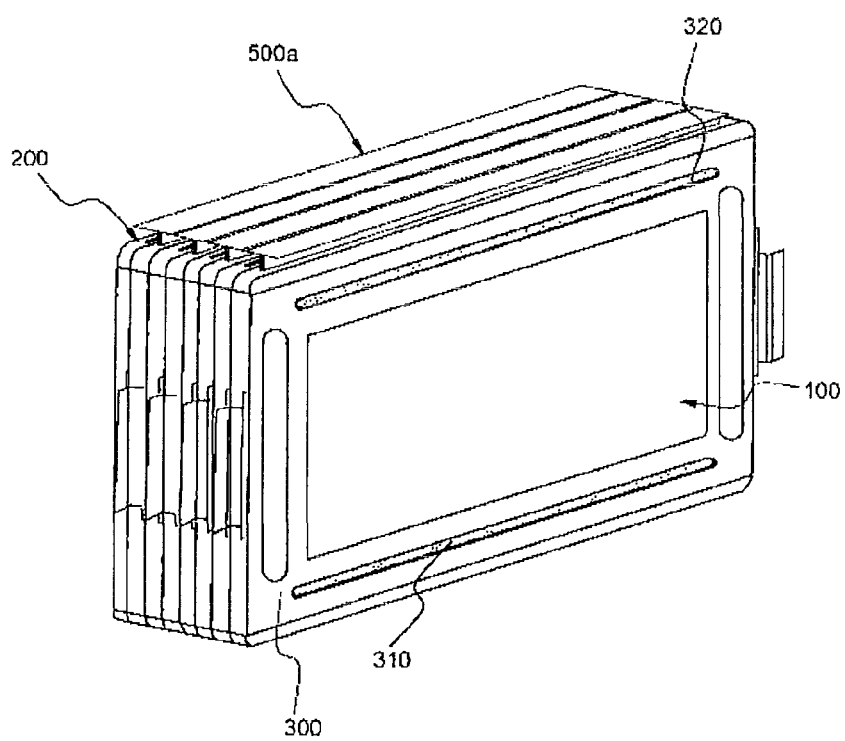
FIG. 6 is a typical view illustrating a battery module constructed in a structure in which heat dissipation members are disposed respectively between battery cartridges, one of which is shown in FIG. 2.
Figure 7:
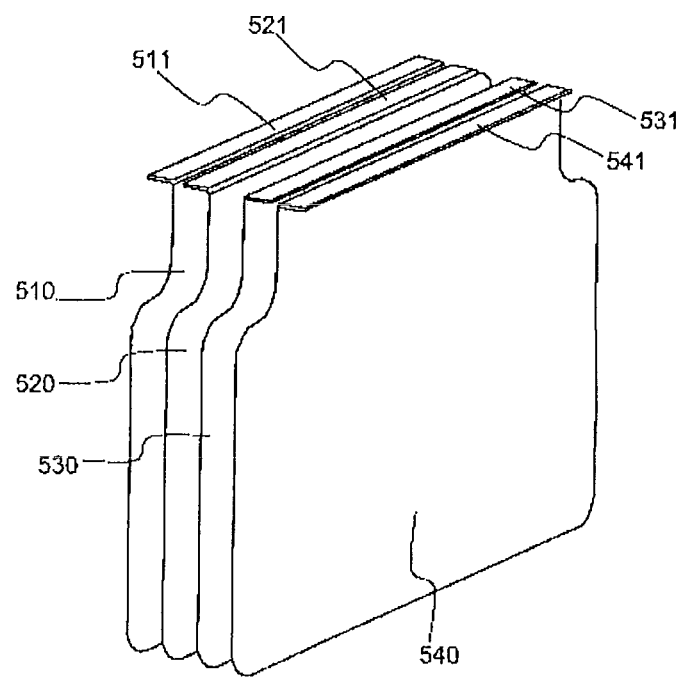
FIG. 7 is a typical view illustrating the heat dissipation members of FIG. 6.

FIG. 6 is a perspective view typically illustrating a battery module 400 constructed in a structure in which heat dissipation members are disposed respectively between battery cartridges, one of which is shown in FIG. 2, and FIG. 7 is a perspective view typically illustrating the heat dissipation members of FIG. 6.

Referring to these drawings, eight cartridges 200 are sequentially stacked in the battery module 400. Four heat dissipation members 500 are disposed at interfaces between the cartridges 200 such that heat generated from the cartridges 200 (exactly, heat generated from battery cells mounted in the cartridges) is transferred to the heat dissipation members 500, thereby achieving a high heat dissipation effect.

Elastically pressing members 310 and 320 mounted to the outer surfaces of frames 300 of the eight cartridges 200 assist the heat dissipation members 500 to be stably mounted and fixed to the frames 300.

Meanwhile, the respective heat dissipation members 510, 520, 530, and 540 are metal plates exhibiting high thermal conductivity. Exposed portions 511, 521, 531, and 541 of the respective heat dissipation members 510, 520, 530, and 540 are bent toward the corresponding sides of the cartridges 200.

Consequently, heat generated from the battery cells 100 during the charge and discharge of the battery cells is transferred to the heat dissipation members 500 interposed between the cartridges 200, and is then discharged to the outside via a heat exchange member (not shown). Consequently, it is possible to achieve high heat dissipation efficiency while constructing the battery module in an overall compact structure.

Figure 8:
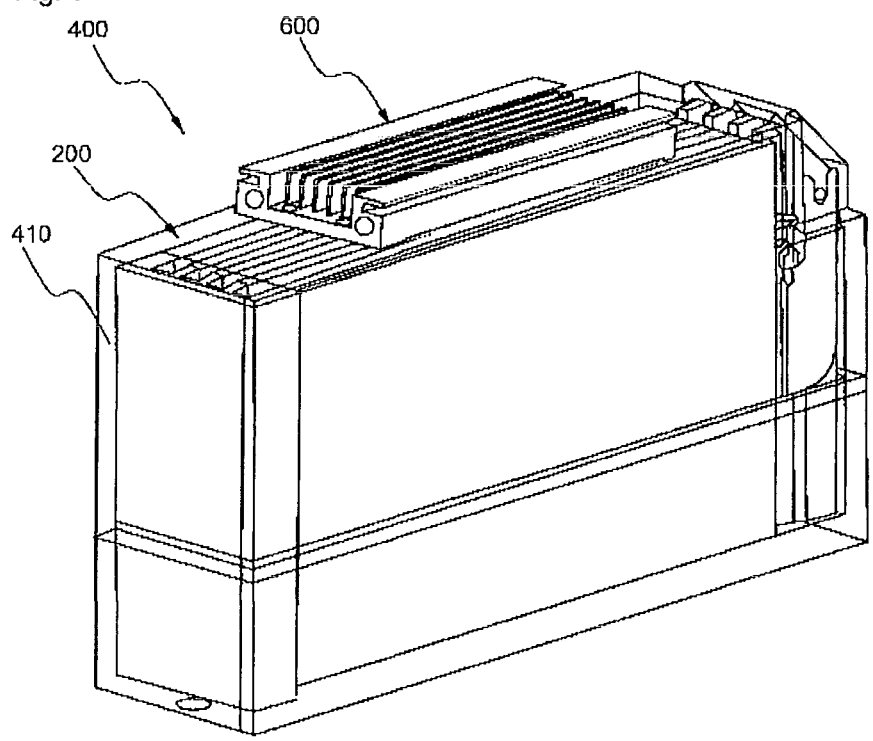
FIG. 8 is a typical view illustrating a structure in which a heat exchange member is attached to one side of a battery module according to an embodiment of the present invention.
Figure 9:
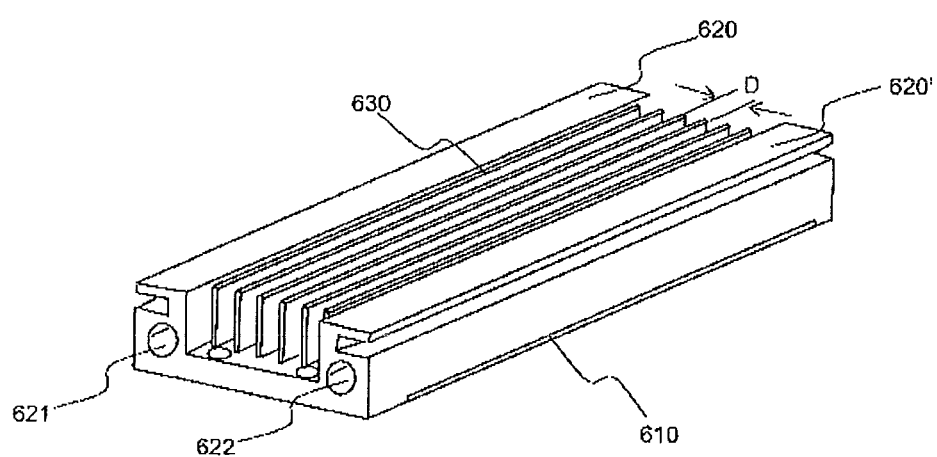
FIG. 9 is an enlarged view typically illustrating the heat exchange member of FIG. 8.

FIG. 8 is a typical view illustrating a structure in which a heat exchange member is attached to one side of a battery module according to an embodiment of the present invention, and FIG. 9 is a typical view illustrating the heat exchange member of FIG. 8.

Referring to these drawings together with FIG. 6, the battery module 400 has a plurality of cartridges 200 mounted in a module case 410. The cartridges 200 are sequentially stacked to form a cartridge stack, and the heat exchange member 600 is attached to the top of the cartridge stack.

Specifically, the heat exchange member 600 is mounted on the upper end of the module case 410. The heat exchange member 600 includes a base 610 to the bottom of which heat dissipation members 500 are tightly connected, opposite sides 620 and 620' connected to the base 610, the opposite sides 620 and 620' having coolant channels 621 and 622 formed therethrough in the longitudinal direction, and a plurality of heat dissipation fins 630 extending upward from the base 610 between the opposite sides 620 and 620'.

A coolant, such as water, flows along the coolant channels 621 and 622, and the heat dissipation fins 630 are spaced apart at predetermined intervals D such that air can flow between the heat dissipation fins. Consequently, it is possible to remove heat transferred from the heat dissipation members 500 with high reliability and excellent cooling efficiency.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention is constructed in a structure in which the heat dissipation members to accelerate the dissipation of heat from the battery cells are disposed at the interfaces between the battery cells, and the heat exchange member integrally connected to the heat dissipation members are attached to one side of a stack of the battery cells. Therefore, it is possible to effectively discharge heat generated from the battery cells to the outside while minimizing the increase in size of the battery module.

Also, it is possible to further improve the dissipation of heat from the battery cells with high reliability by adding a water-cooling type cooling method to the heat exchange member. Such high heat dissipation efficiency uniformly controls the interior temperature of the respective battery cells, and eventually, it is possible to greatly improve the service life and safety characteristics of the battery cells.

The invention claimed is:

1. A battery module constructed in a structure in which a plurality of plate-shaped battery cells are sequentially stacked in a module case, wherein each of the plate-shaped battery cells includes an electrode assembly of a cathode/separator/anode structure mounted in a battery case formed of a laminate sheet including a resin layer and a metal layer, each of the battery cells is mounted in a frame-type battery cartridge, a plurality of heat dissipation members are disposed at two or more interfaces between the battery cells, and a heat exchange member integrally interconnecting the heat dissipation members is mounted to one side of a stack of the battery cells, whereby heat generated from the battery cells during the charge and discharge of the battery cells is removed by the heat exchange member, wherein the cartridge includes at least one pair of plate-shaped frames for fixing edges of each of the battery cells in a state in which at least one side of each of the battery cells is exposed, and each of the frames is provided at the outer surface thereof with elastically pressing members for fixing the corresponding heat dissipation member to the exposed side of each of the battery cells in a tight contact fashion, and wherein the frames are provided separately from the heat dissipation members.

2. The battery module according to claim 1, wherein the laminate sheet is constructed in a structure including a thermally weldable inner resin layer, a blocking metal layer, and a durable outer resin layer.

3. The battery module according to claim 1, wherein the elastically pressing members are mounted to upper and lower sides and/or left and right sides of the outer surface of each of the frames.

4. The battery module according to claim 1, wherein each of the battery cells is mounted to the frames in a state in which the exposed side of each of the battery cells protrudes from the corresponding frame, and the elastically pressing members are mounted to the outer surfaces of the frames with a height greater than a protruding height of the exposed side of each of the battery cells.

5. The battery module according to claim 1, wherein the elastically pressing members are made of a polymer material providing an elastically pressing force when the polymer material is pressed.

6. The battery module according to claim 1, wherein each of the frames is provided at the outer surface thereof with grooves, and the elastically pressing members are in the respective grooves.

7. The battery module according to claim 1, wherein each of the heat dissipation members is a metal plate exhibiting thermal conductivity.

8. The battery module according to claim 1, wherein the heat exchange member is made of a metal material exhibiting thermal conductivity.

9. The battery module according to claim 1, wherein the heat dissipation members are disposed at the interfaces between the battery cells in a state in which at least a portion of each of the heat dissipation members is exposed outside the stacked battery cells with respect to the frames, and the exposed portions are bent toward the corresponding sides of the battery cells.

10. The battery module according to claim 9, wherein the heat exchange member is mounted to the tops of the bent portions of the heat dissipation members.

11. The battery module according to claim 9, wherein the heat exchange member is provided with one or more coolant channels for allowing a coolant to flow therethrough.

12. The battery module according to claim 11, wherein the heat exchange member is constructed in a structure including a base to the bottom of which the heat dissipation members are tightly connected, opposite sides connected to the base, the opposite sides having the coolant channels formed therethrough in the longitudinal direction, and a plurality of heat dissipation fins extending upward from the base between the opposite sides.

13. The battery module according to claim 1, wherein the heat exchange member is mounted on the upper end of the module case.

14. The battery module according to claim 1, wherein the module case is provided at the upper end thereof with a depression having a size sufficient to receive the heat exchange member, and the heat exchange member mounted in the depression has a height equal to or less than that of the upper end of the module case.

15. A battery pack of high power and large capacity including two or more battery modules according to claim 1 based on desired power and capacity.

16. The battery pack according to claim 15, wherein the battery pack is a power source for electric vehicles, hybrid electric vehicles, or plug-in hybrid electric vehicles.

* * * * *